United States Patent
Sakashita et al.

(10) Patent No.: US 6,805,296 B2
(45) Date of Patent: Oct. 19, 2004

(54) PROCESSING METHOD AND SYSTEM OF DATA MANAGEMENT FOR IC CARD

(75) Inventors: Masahiro Sakashita, Tokyo (JP); Masayuki Nakagawa, Tokyo (JP); Akira Ishibashi, Tokyo (JP); Takao Yoden, Tokyo (JP); Masashi Takeda, Tokyo (JP)

(73) Assignees: Hitachi, Ltd., Tokyo (JP); Hitachi Capital Corporation, Tokyo (JP)

( * ) Notice: Subject to any disclaimer, the term of this patent is extended or adjusted under 35 U.S.C. 154(b) by 0 days.

(21) Appl. No.: 09/896,933

(22) Filed: Jun. 28, 2001

(65) Prior Publication Data

US 2002/0030099 A1 Mar. 14, 2002

(30) Foreign Application Priority Data

Jun. 28, 2000 (JP) ........................................ 2000-194840

(51) Int. Cl.[7] .............................................. G06K 19/00
(52) U.S. Cl. ........................ 235/487; 235/380; 235/492
(58) Field of Search ................................ 235/487, 379, 235/492, 375, 380, 382, 441, 449; 710/5

(56) References Cited

U.S. PATENT DOCUMENTS

| | | | | |
|---|---|---|---|---|
| 4,804,825 A | * | 2/1989 | Bitoh | 235/380 |
| 4,877,945 A | * | 10/1989 | Fujisaki | 235/379 |
| 5,012,076 A | * | 4/1991 | Yoshida | 235/379 |
| 5,197,001 A | | 3/1993 | Mukherjee | |
| 5,548,506 A | | 8/1996 | Srinivasan | |
| 5,727,230 A | * | 3/1998 | Fujioka | 710/5 |
| 5,796,092 A | * | 8/1998 | Nagata et al. | 235/492 |
| 5,890,158 A | | 3/1999 | House et al. | |
| 5,973,964 A | * | 10/1999 | Tobita et al. | 365/185.29 |
| 6,032,858 A | * | 3/2000 | Yazumi et al. | 235/379 |
| 6,070,795 A | * | 6/2000 | Feiken | 235/380 |
| 6,308,164 B1 | | 10/2001 | Nummelin et al. | |
| 6,393,410 B1 | | 5/2002 | Thompson | |
| 6,401,119 B1 | | 6/2002 | Fuss et al. | |
| 6,527,190 B1 | * | 3/2003 | Weinlander | 235/487 |
| 2003/0023577 A1 | | 1/2003 | Zudil et al. | |

FOREIGN PATENT DOCUMENTS

| | | |
|---|---|---|
| EP | 0 152 024 A2 | 8/1985 |
| EP | 0 402 759 A2 | 12/1990 |
| EP | 0 870 581 A1 | 9/1995 |
| EP | 0 945 833 A2 | 9/1999 |
| WO | WO 00/24890 A1 | 5/2000 |
| WO | WO 01/91477 A2 | 5/2001 |
| WO | WO 02/19212 A2 | 3/2002 |
| WO | WO 02/21310 A2 | 3/2002 |
| WO | WO 02/25531 A2 | 3/2002 |

* cited by examiner

Primary Examiner—Diane I. Lee
Assistant Examiner—Kumiko C. Koyama
(74) Attorney, Agent, or Firm—Townsend and Townsend and Crew LLP (57) ABSTRACT

In accordance with the invention, a method and system is provided wherein IC card information can be changed in either of two ways: (1) the information stored in IC card is changed independently of the information that the center facility maintains, and then the corresponding IC card information maintained by the center facility is updated to reflect the changes made in the IC card, and (2) the IC card information maintained in the center apparatus is changed, and then the corresponding information in the IC card is updated to reflect the changes made in the center apparatus.

9 Claims, 7 Drawing Sheets

PROCESSING METHOD AND SYSTEM OF DATA MANAGEMENT FOR IC CARD

CROSS-REFERENCES TO RELATED APPLICATIONS

This application claims priority from Japanese Patent Application No. 2000-194840, filed Jun. 28, 2000, which disclosure is incorporated herein by reference.

BACKGROUND OF THE INVENTION

The present invention relates to a process method and system of data management for integrated circuit (IC) card, and more particularly to a method of changing information stored in IC card and information maintained in a center facility, and to an IC card system.

IC cards are widely used as financial card, credit card, debit card and so on. These cards are configured to store various information such as card-holder's information (e.g., name, address, postal code, phone number, birth date, password), financial institution name, branch name, type of account, account number, and mode of payment, and data and program necessary for application process according to the intended use of the IC card. These information items are usually stored in the IC card at the time of issuing the IC card. Therefore, when the card-holder decides to change the information in the IC card after issuance of the card, the card-holder is required to ask the IC card issuing agency or organization to make the change. The card-holder must also complete, sign and seal a document (e.g., a change request form) provided by the issuing organization, and send the document together with the IC card to the issuing organization.

Because of such inconvenient changing procedures, card-holders tend not to change such security-critical information as the password as regularly as should be done. Thus, protection against unauthorized use of the IC card is compromised.

BRIEF SUMMARY OF THE INVENTION

Accordingly, it is an object of the invention to provide a method and system for changing IC card information wherein the above problems are eliminated. In accordance with the invention, a method and system is provided wherein IC card information can be changed in either of two ways: (1) the information stored in IC card is changed independently of the information that the center facility maintains, and then the corresponding IC card information maintained by the center facility is updated to reflect the changes made in the IC card, and (2) the IC card information maintained in the center apparatus is changed, and then the corresponding information in the IC card is updated to reflect the changes made in the center apparatus.

In accordance with one embodiment of the present invention, an IC card system includes a center apparatus and an IC card having IC card-holder's information stored therein. The IC card includes a receiver configured to receive change requests for changing the card-holder's information. The IC card further includes a storage area configured to store change-allowance-information, wherein the change request is rejected if said change-allowance-information indicates "change in progress" but is processed if said change-allowance-information indicates "no change in progress".

Upon receipt of a change request, if the change-allowance-information indicates "no change in progress", the change-allowance-information is changed to indicate "change in progress". In that case, new content for one or more information items in the card-holder's information is received and stored in the IC card.

In one embodiment, the "change in progress" corresponds to a condition wherein a previous change request is in the course of being processed by the IC card system, and the "no change in progress" corresponds to a condition wherein either the processing of a previous change request has been completed by the IC card system or no previous change request has been made.

In another embodiment, the new content stored in the IC card is transmitted from the IC card to the center apparatus. The center apparatus stores the new content and resets the change-allowance-information in the IC card to "no change in progress".

In another embodiment, the card-holder's information stored in the IC card includes one or more changeable information items and one or more un-changeable information items.

In another embodiment, before storing the new content for the card-holder's information items, identification information is required from the change requester to determine if the change request is made by an authorized party. The received identification information is compared with a corresponding predesignated identification information stored in the IC card as one of the un-changeable information items, and if no match is found, the change request is rejected, but if a match is found, the new content for the card-holder's information items is allowed to be stored in the IC card.

The information maintained by the center apparatus may be updated with the changed information stored in the IC card at the time of first on-line transaction after the change is stored in the IC card. In addition, the IC card can add a change-enabling identifier to those items of card-holder's information which can be changed, and store them as changeable information, and add a change-disabling identifier to those items of card-holder's information which can not be changed, and store them as un-changeable information or in a form incapable of being accessed.

The above object can also be achieved by use of a program capable of executing the above functions or a recording medium in which such program is stored.

Further features and advantages of the present invention will become more fully apparent form the following detailed description of the invention, the appended claims, and the accompanying drawings.

DETAILED DESCRIPTION OF THE INVENTION

Embodiments of an IC card information-changing method and IC card system according to the invention will be described in detail with reference to the accompanying drawings.

In accordance with an embodiment of the invention, an IC card system is provided wherein information such as password stored in an IC card can be changed off-line through operations carried out in the IC card, and then corresponding information maintained at a host that issued the IC card can be updated to reflect the changes made in the IC card. In one embodiment, the information stored in the IC card is changed as follows. The card-holder, attempting to change an information item, such as the password, inserts the IC card into an IC card reader/writer connected to, for example, the card-holder's personal computer (PC) or the like, selects an information-changing mode as one of the applications using the IC card, and enters an item of information (such as an identification information) that is previously set to be un-changeable. The processor within the PC compares the inputted information with the corresponding information previously stored within the card. If the inputted information is correct (e.g., the inputted identification information, such as birth date, matches the corresponding identification information in the IC card), the card-holder is prompted to select one of more of the indicated changeable items of information, and enter new content for the selected one or more items of information. The new content is stored in the IC card.

The programs for executing the processing method of the embodiments of the invention can be provided by storing them in recording media such as CD, MO or DVD.

Figure 1:
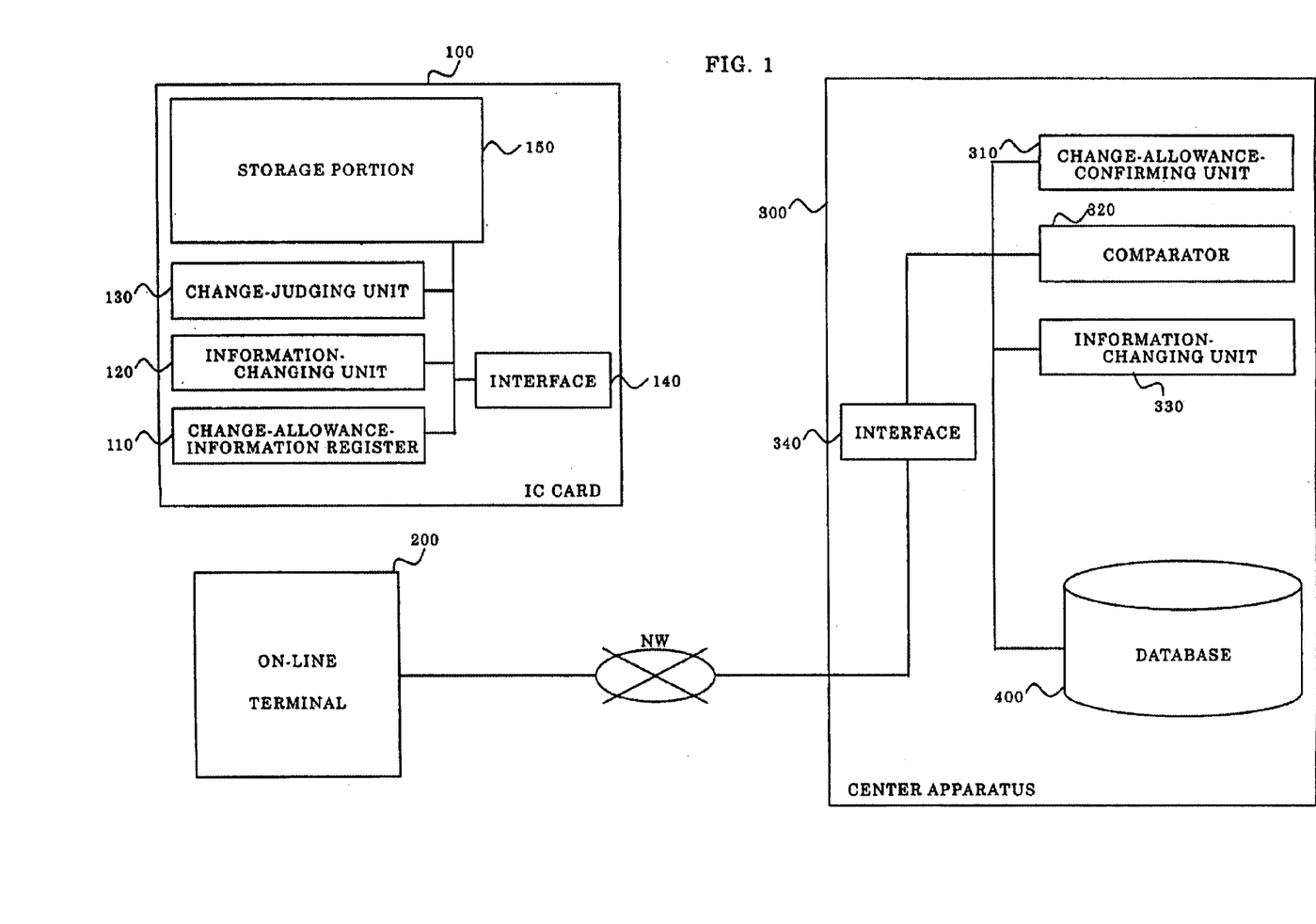
FIG. 1 is a block diagram schematically showing the construction of an IC card system according to one embodiment of the invention.

FIG. 1 shows a block diagram of an IC card system in accordance with one embodiment of the invention. As illustrated, an IC card 100 has a change-allowance-information register 110 which registers information indicating whether a change request for changing card-holder's information can be processed, an information-changing unit 120, a change-judging unit 130, an interface 140 and a storage portion 150. Changed information stored in IC card 100 is communicated to a center apparatus 300 through an on-line terminal 200.

Center apparatus 300 has a change-allowance-confirming unit 310 for indicating whether a change request has been allowed to be processed, a comparator 320, an information-changing unit 330, an interface 340, and a database 400.

In one embodiment of the IC card system, the change-allowance-information register 110, information-changing unit 120, change-judging unit 130 and interface 140 are incorporated in the on-line terminal 200 rather than in IC card 100.

Figure 2:
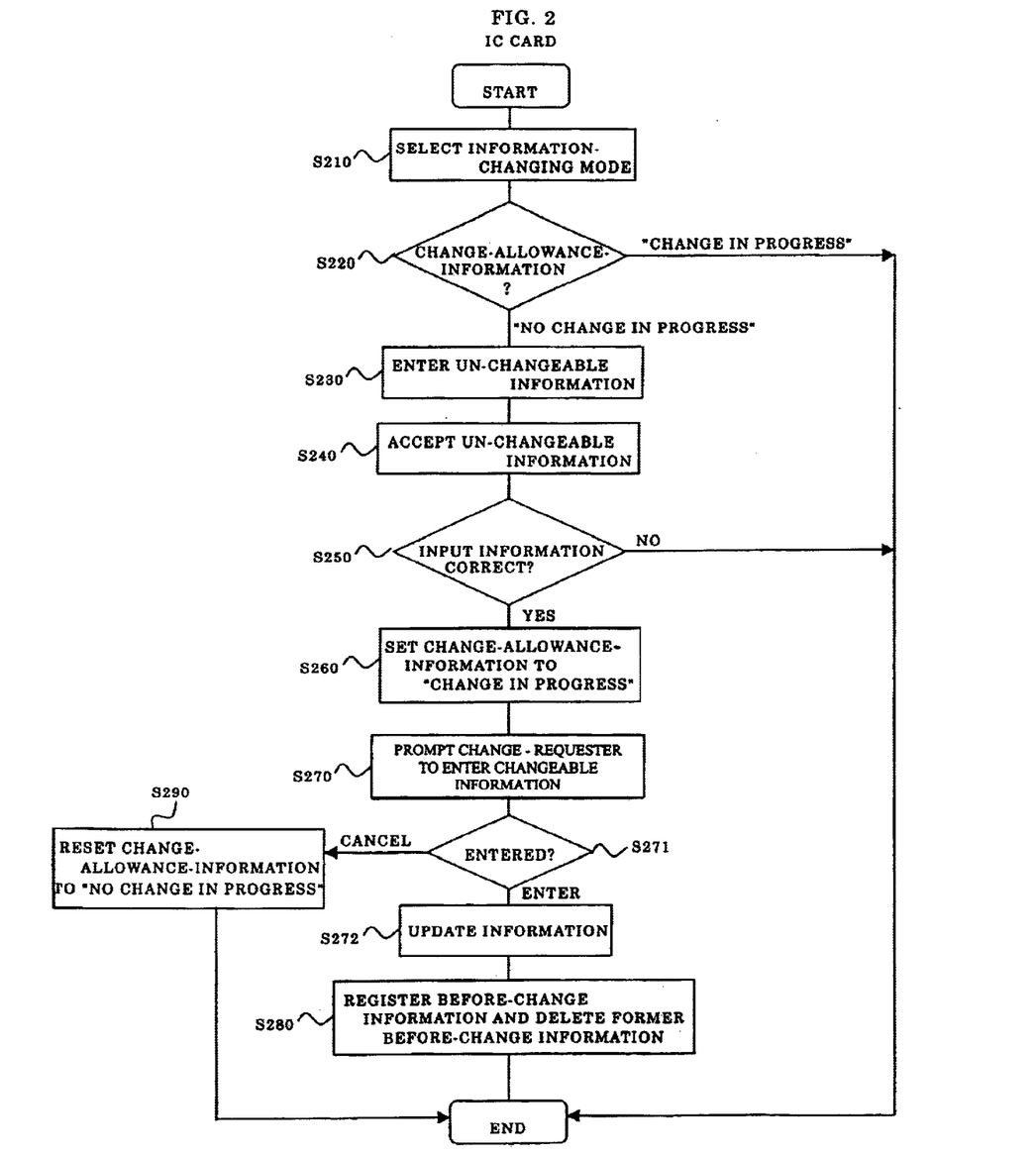
FIG. 2 is a flowchart to which reference is made in explaining the sequence of operations involved in changing information in the IC card in accordance with one embodiment of the invention.

FIG. 2 is a flowchart to which reference is made in explaining the process for changing the internal information of IC card 100 according to one embodiment of the invention. It is assumed that IC card 100 includes such information as card-holder's name, birth date, postal code, phone number, address (which may be only the last numerical portion of address or number of lot), and password previously stored as items for identification. For example, of the above information items, the name and birth date have write-disabling identifiers added to them in order to prevent altering them, and are stored in IC card 100 in such manner that they cannot be accessed by an unauthorized party. On the other hand, the postal code, phone number, address (which may be only number of lots) and password have write-enabling identifiers added to them in order to enable altering them, and are stored in IC card 100.

The card-holder, in attempting to change information stored in the IC card, such as information about credit card or bank cash card that the card-holder possesses, inserts the IC card 100 into an IC card reader/writer connected to card-holder's apparatus information terminal such as a PC. Then, the card-holder selects an information-changing mode as one of the applications for using the IC card 100 (step S210).

Next, the change-judging unit 130 of IC card 100 checks the change-allowance-information setting. If the change-allowance-information setting indicates "no change in progress", the card-holder's change request is allowed to be further processed, and the process goes to the next step. If the change-allowance-information setting indicates "change in progress", the card-holder's change request is rejected and the process ends (step S220). Here, "change in progress" corresponds to a condition wherein a previous change request is in the course of being processed by the IC card system, and "no change in progress" corresponds to a condition wherein either the processing of a previous change request has been completed by the IC card system or no previous change request has been made.

The card-holder, according to the instruction displayed on the screen resulting from selecting the information-changing mode, enters new content for one or more items of information chosen from the category of un-changeable information items. As an example, assume a birth date has been entered as an identification information which is not provided on the face of the card and which falls in the category of unchangeable information items (steps S230, S240).

Change-judging unit 130 compares the newly inputted birth date information with the birth date information previously stored in IC card 100 to determine if the newly entered information is correct. Thus, if IC card 100 is used by an unauthorized user (e.g., if it is lost or stolen), this checking mechanism prevents the unauthorized user from obtaining the information that was previously stored in a read-protected form in the card (step S250).

If, at step S250, the newly inputted information does not match the corresponding information in the IC card, the process ends. If there is a match, the change-allowance-information is set to "change in progress" (step S260). Next, the changeable information items are displayed on the screen, and the card-holder is prompted to enter new content for one or more of the changeable items of information (S270). At this time, no specific contents of items that are already stored in IC card 100 is displayed on the screen.

Thus, the card-holder enters new content for one or more of the items of information according to the instruction on the screen (Step S271). Here, a description will be provided using an example wherein a new password is entered by the card-holder in order to change the existing password in the IC card.

The information-changing unit 120 registers the newly inputted information item, e.g., the new password, into the IC card, and ends the process for changing information in the IC card (step S272). At this time, the previous content of the changed items of information is maintained in IC card 100 as "before-change" information (step S280). If a "before-change" information exists in the card from a previous change request, such preexisting "before-change" information is deleted (step S280). Alternatively, a flag may be used to indicate "before-change" information, and the flag may be deleted from the pre-existing "before-change" information, and added to the newly inputted content.

At step S271, if the card-holder decides to end the process without entering new information, the information-changing unit 120 resets the change-allowance-information from "change in progress" to "no change in progress" (step S290), and ends the process.

If, at the step S210, an application other than the information-changing mode is selected, this application is executed.

While in the above embodiment only one item of identification information (e.g., birth date) is checked before the card-holder is allowed to change information held in the IC card, the invention is not limited as such. Multiple items of identification information (such as password) may be required from the card-holder before the card-holder is allowed to change information held in the IC card. Accordingly, the unauthorized use of the IC card is prevented. Further, IC card 100 with its internal information changed as described above can be immediately used for off-line transaction on the basis of the changed information.

While the change of information in IC card 100 is performed by connecting an IC card reader/writer to an information terminal such as a PC, the above process may be implemented by a terminal provided exclusively for such use. In addition, step S260 (setting change-allowance-information to "change in progress") may be carried out after new content for changeable item of information is received, or after the new content is registered in the IC card. In both these cases, step S290 may be eliminated.

Figure 3:
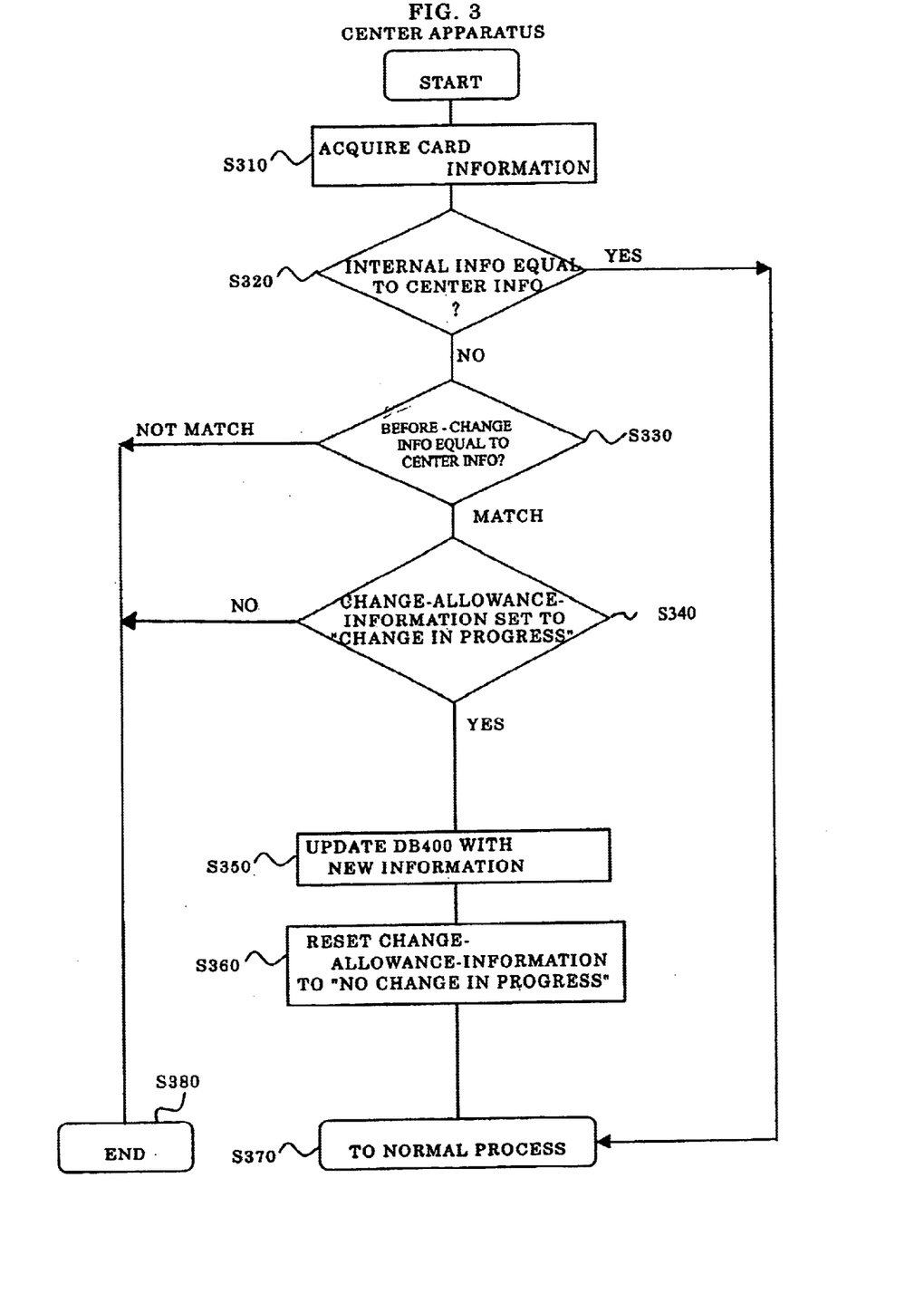
FIG. 3 is a flowchart to which reference is made in explaining the sequence of operations involved in updating the information in the center apparatus with changes made in the IC card.

FIG. 3 is a flowchart showing the sequence of operations in center apparatus 300 (for example, the host that issues the IC card) when the IC card is used for a transaction for the first time after the internal information of the IC card has been changed. In accordance with the FIG. 3 flow chart, the card-holder's information maintained in center apparatus 300 is updated to reflect the changes made in the IC card. The program for executing the process here can be stored in a recording medium such as CD, MO or DVD.

When the on-line terminal 200, such as a store, and the center apparatus 300 that issued the IC card are connected at the time of an on-line transaction using IC card 100, the card information is sent to center apparatus 300 (step S310). The comparator 320 of center apparatus 300 compares the transmitted information with the corresponding information stored in the center data base (DB) 400 to determine if they match (step S320). If there is a match, center apparatus 300 executes the normal process (e.g., the transaction) or processes other than the change of card-holder's information registered in the database 400 and maintained by the center apparatus (step S370). If there is not a match, comparator 320 further compares the "before-change" content of the non-matching information item received from the IC card with the corresponding information in DB 400 to determine if there is a match (step S330). As an example, the password prior to being changed in the IC card is received by center apparatus and compared to the password maintained in the center apparatus to determine if they match. If there is not a match, the card is processed as abnormal, and the process ends (step S80). In this case, center apparatus 300 informs on-line terminal 200 of the fact that the transaction cannot be processed, though not shown.

If, at step S330, the "before-change" information transmitted from the IC card to the center apparatus matches the corresponding information stored in the center DB, the change-allowance-confirming unit 310 checks if the change-allowance-information in the IC card is set to "change in progress" or "no change in progress" (step S340). If the change-allowance-information is set to "no change in progress", the card is processed as abnormal and the process ends in the same way as described above (step S380). If the change-allowance-information is set to "change in progress", information-changing unit 330 updates DB 400 with the new information (step S350), e.g., the new password, and the "change in progress" setting of the change-allowance-information in IC card 100 is reset to "no change in progress" (step S360), and the transaction is allowed to be processed (step S370).

Figure 4:
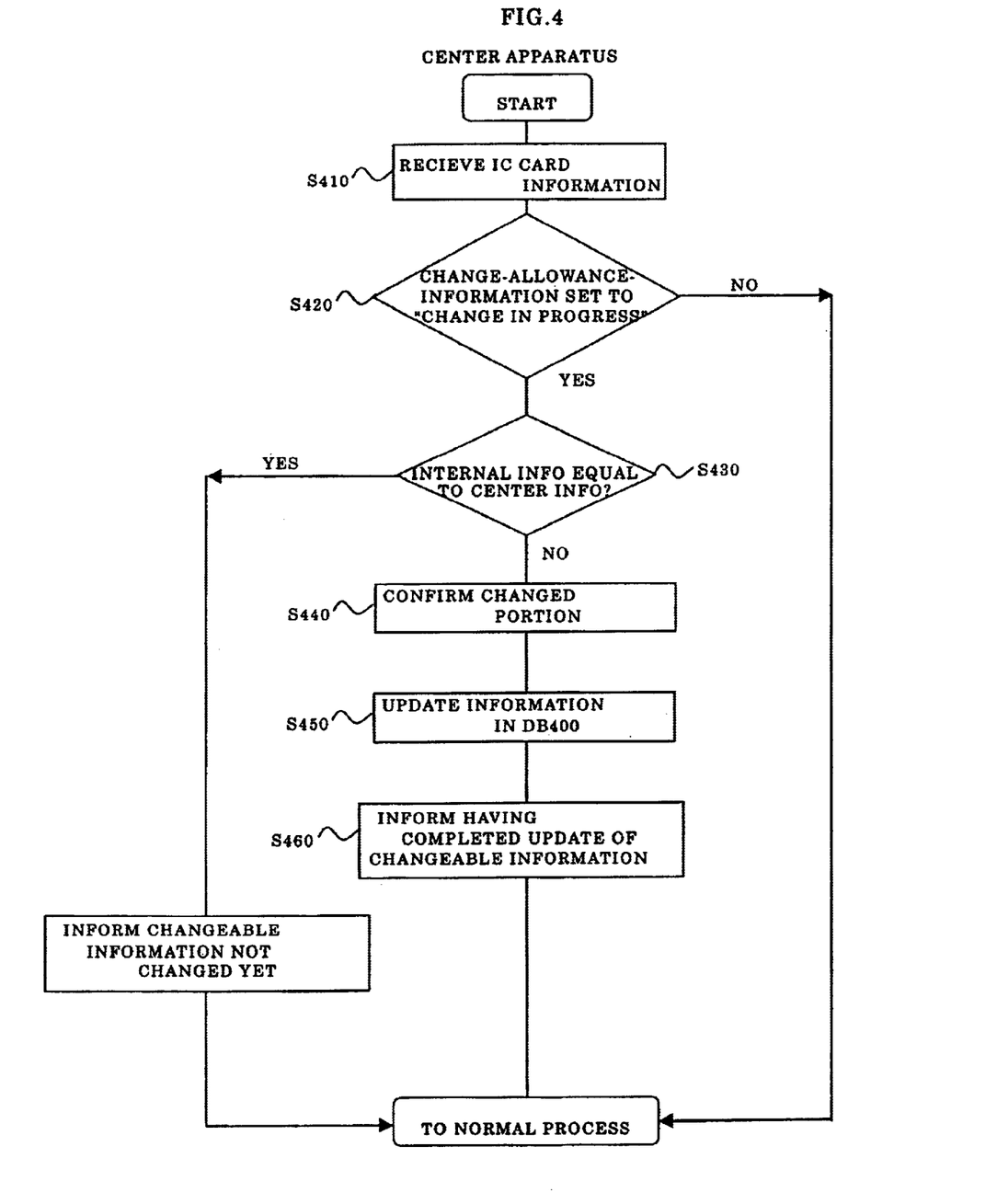
FIG. 4 is a flowchart to which reference is made in explaining an alternate sequence of operations involved in updating the information in the center apparatus with changes made in the IC card.

In an alternate embodiment shown in FIG. 4, only the setting for the change-allowance-information is checked (step S420) by the center apparatus after the center receives the IC card information. If the change-allowance-information is set to "change in progress", the changed information from the IC card 100 is compared with the corresponding information in center apparatus 300 (step S430). Then, after the confirmation of the changed portion (Step S440), the information in DB 400 is updated (step S450).

In either of FIGS. 3 and 4 flow chart embodiments, when IC card 100 is used in the first transaction after its internal information is changed, center apparatus 300 automatically updates the contents of DB 400 to reflect the newly changed information in the IC card.

In an alternate embodiment of the FIG. 3 flow chart, the step of checking if the "before-changing" information matches the corresponding information in DB 400 at step S330 may be omitted so that the overall process can be simplified. Moreover, in the process mentioned with reference to FIGS. 1 and 2, the "before-changing" information no longer need to be maintained.

In accordance with the above embodiments of the invention, information items designated in IC card 100 as changeable items can be changed by the card-holder. Any changes made by the card-holder to these changeable items can be updated in center apparatus 300 when IC card 100 is used in on-line transaction for the first time after the change has been made in the IC card.

The flow charts of FIGS. 2–4 represent the case where information in the IC card is changed by performing a sequence of operations in the IC card itself, and then the corresponding information in the center apparatus is updated with the changes made in the IC card. However, the opposite case may also occur, namely, information in the center apparatus is changed first, and then the corresponding information in the IC card is updated with the changes made in the center apparatus. An example of when information items are first changed in the center apparatus would be where the center apparatus changes the expiration date upon credit card renewal. Another example would be where card-holder makes a request for change of address to the center apparatus manager by mail or telephone for the reason of a move or the like. In this example, the address information in center pparatus 300 is changed by the manager of center apparatus 300, and the address of the card-holder is already changed by occasion of changing his or her place of residence.

Figure 5:
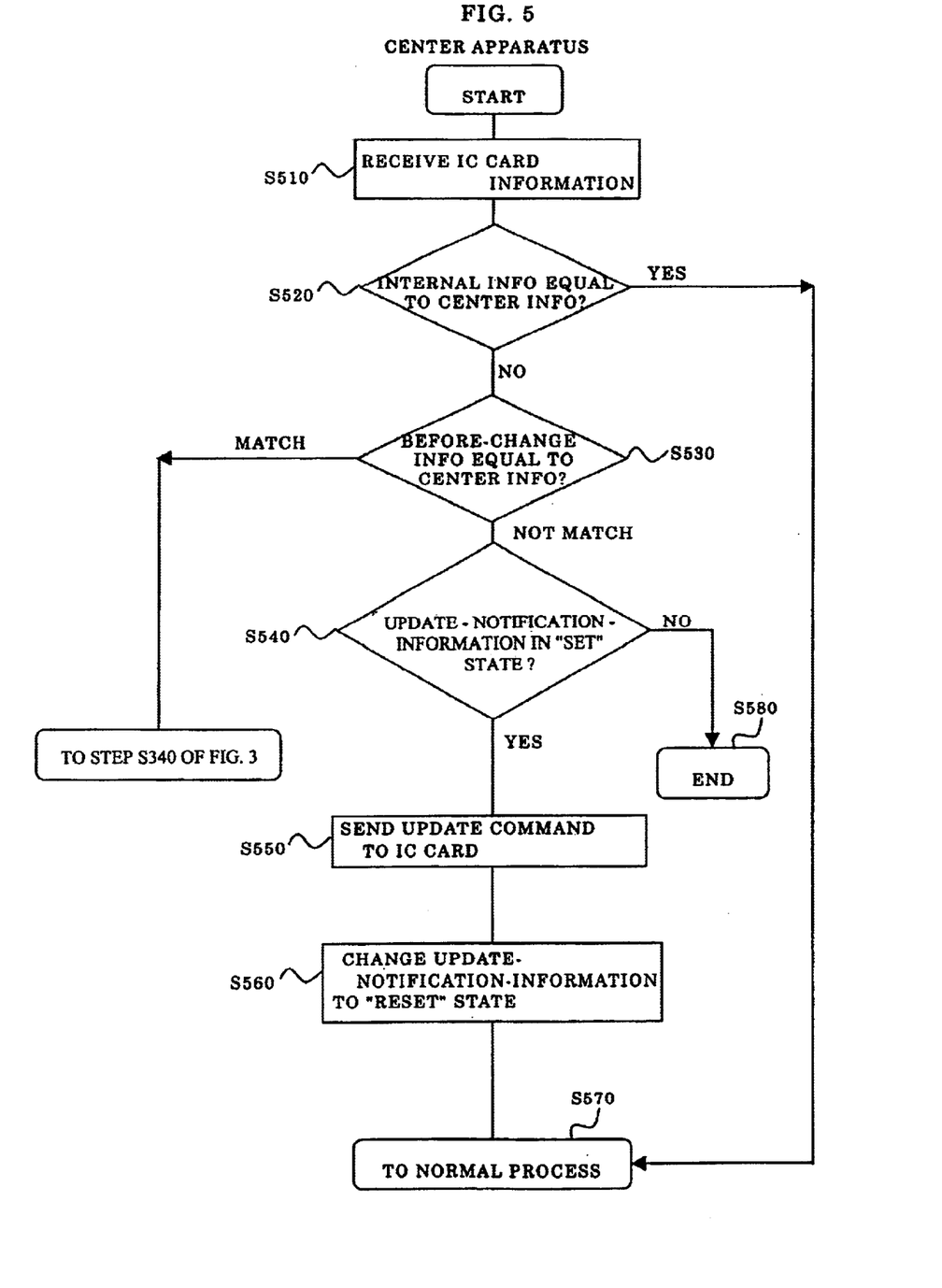
FIG. 5 is a flowchart to which reference is made in explaining the sequence of operations involved in the case where information change is first made in the center apparatus, and then the corresponding information in the IC card is updated to reflect the changes made in the center apparatus.

FIG. 5 is a flow chart showing the sequence of operations for both the case wherein information in the IC card is changed followed by updating the corresponding information in the center apparatus, and the reverse case wherein information in the center apparatus is changed followed by updating the corresponding information in the IC card.

Center apparatus 300 maintains an update-notification-information which is used to indicate whether a change has been made in the information held in the center apparatus, and if a change has been made, the corresponding information in the IC card needs to be updated. In one embodiment, the update-notification-information is held in a "reset" state when no change of information has taken place in DB 400 and thus no updating is required in the IC card, but is changed to a "set" state when information in DB 400 has been changed, thus requiring that the corresponding information in the IC card be updated to reflect the change. Each item of changed information in DB 400 is associated with a specific IC card by using card-identifier information such as card number.

When an on-line transaction is initiated by inserting IC card 100 in the on-line terminal 200, and the on-line terminal 200, such as a cyber shop, establishes communication with center apparatus 300, the card information is transmitted to center apparatus 300 (step S510). Center apparatus 300 compares the information transmitted by the IC card with the corresponding information stored in DB 400 to determine if they match (step S520). If they match, the center apparatus allows the transaction to take place, or processes operations other than changing of card-holder's information (step S570). If they do not match, one of two scenarios is possible. One is where a change was previously made to information maintained in the center apparatus, but the information in the IC card has not yet been updated to reflect the change. The other is where a change was previously made in the information held in the IC card, but the center apparatus information has not yet been updated to reflect the change.

Accordingly, at step S530, center apparatus 300 further compares the pre-change information in the IC card with corresponding information stored in DB 400. A match indicates that the IC card information has been changed and the corresponding information in the center apparatus needs to be updated. In that case, the process moves to step S340 of FIG. 3 and continues as indicated in FIG. 3, thus, resulting in updating the information in the DB 400 to reflect the changed information in the IC card. If the pre-change information in the IC card does not match the corresponding information stored in DB 400, center apparatus checks to determine if the update-notification-information is in the "set" state (step S540).

If, at step S540, the update-notification-information in the center apparatus is found not to be in the "set" state, center apparatus 300 considers the card abnormal, and ends the process (step S580). If the update-notification-information is found to be in the "set" state, thus indicating that the information in the center apparatus has been changed, center apparatus 300 transmits an update command information (such as update item, and contents of new information) to the IC card, changes the update-notification-information to the "reset" state, and ends the update process (steps S550, S560).

Information-changing unit 120 of IC card 100 receives the update command, and updates the corresponding information in IC card 100. Such update occurs automatically in the IC card when the IC card is used for the first time after the information change has been made in the center apparatus.

Thus, as can be seen, changeable information in IC card 100 can be changed by the center apparatus as well as by the card-holder.

Figure 6:
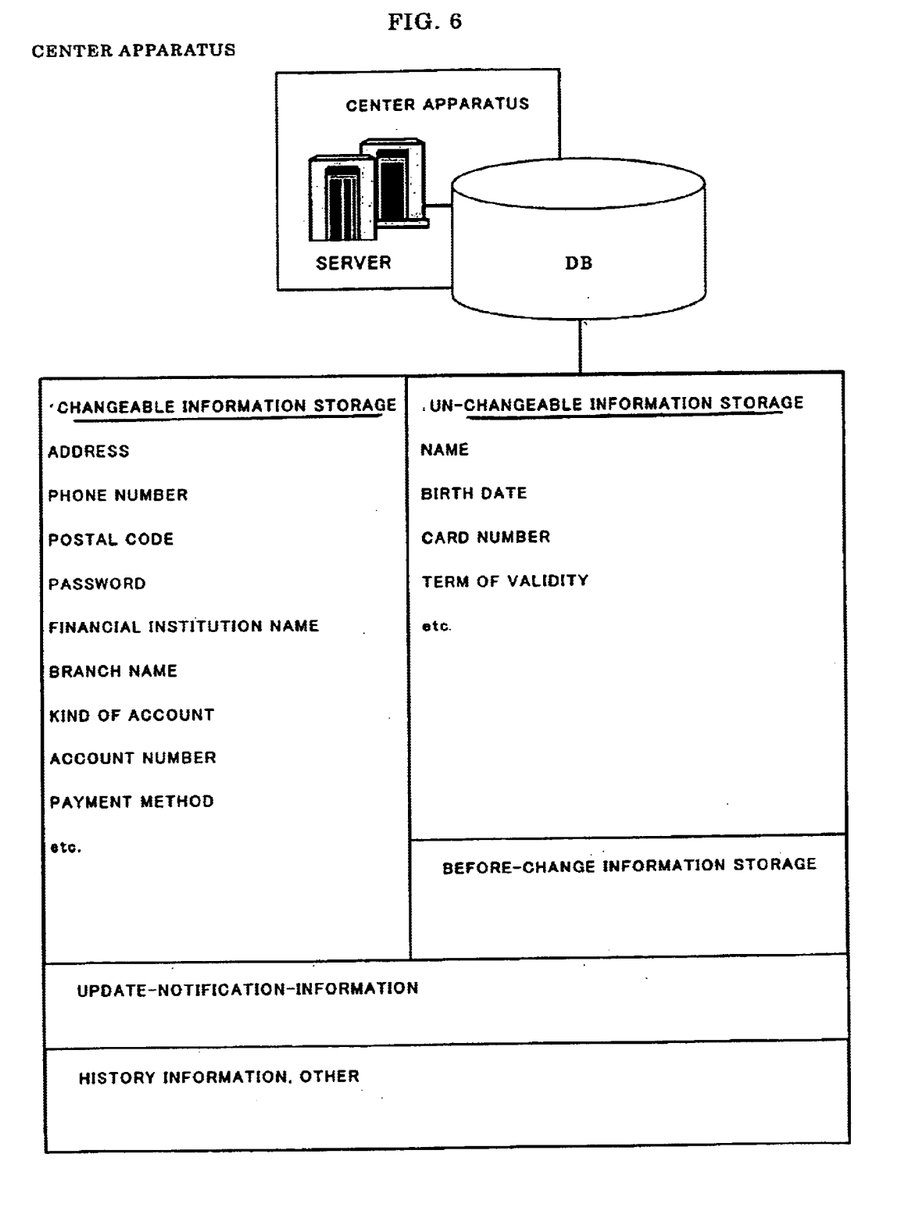
FIG. 6 is a diagram to which reference is made in explaining the contents of information maintained in data base DB of the center apparatus.

FIG. 6 is a diagram showing some of the contents of DB 400 in the center apparatus. In DB 400, a change-enabling identifier is added to information items that are allowed to be changed, and a change-disabling identifier is added to information items that are not allowed to be changed. Accordingly, the information items allowed to be changed are stored in DB 400 in changeable form, and the information items not allowed to be changed are stored in DB 400 in un-changeable form. While address, postal code, phone number, password, financial institution name, branch name, kind of account, account number and payment method are considered as changeable information, and card-holder name, birth date and card number as un-changeable information, this classification is not absolute and may vary according to what the card company or card-holder desires.

Figure 7:
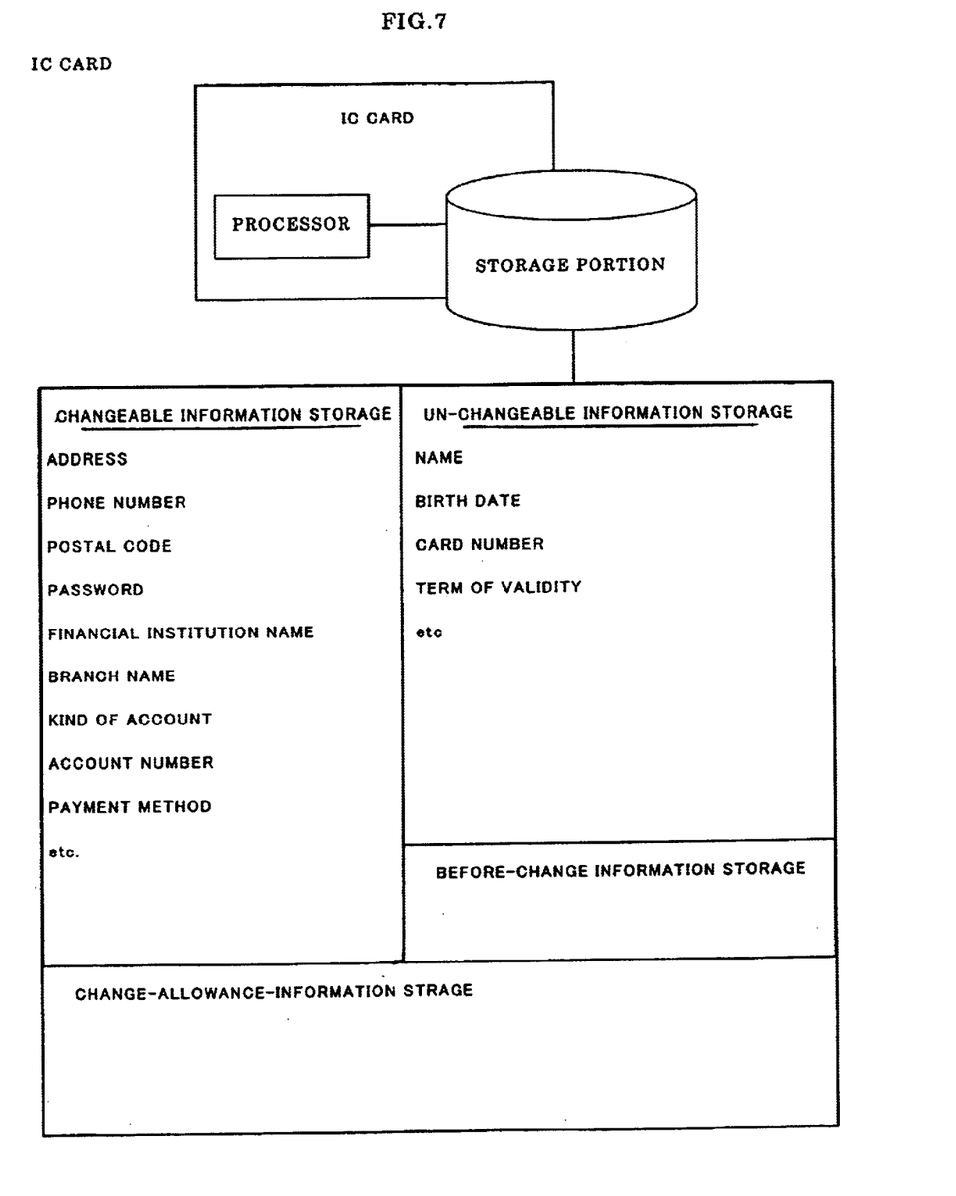
FIG. 7 is a diagram to which reference is made in explaining the contents of information maintained in a storage portion of the IC card.

FIG. 7 is a diagram showing some of the contents of storage portion 150 of IC card 100. In storage portion 150, similar to DB 400 in the central apparatus, a change-enabling identifier is added to information items that are allowed to be changed, and a change-disabling identifier is added to information items that are not allowed to be changed. Accordingly, the information items allowed to be changed are stored in storage portion 150 in changeable form, and the information items not allowed to be changed are stored in storage portion 150 in un-changeable form. While address, postal code, phone number, password, financial institution name, branch name, kind of account, account number and payment method are considered as changeable information, and card-holder name, birth date and card number as un-changeable information, this classification is not absolute and may vary according to what the card company or card-holder desires.

Thus, according to the present invention, among other advantages, a card-holder is able to easily change his or her password at any time, and this change can be reflected at the card-issuer center so that the total system security is improved.

While the present invention has been particularly shown and described with reference to the preferred embodiments, it will be understood that the various changes and modifications will occur to those skilled in the art without departing from the scope and true spirit of the invention. The scope of the invention is therefore to be determined solely by the appended claims.

What is claimed is:

1. A method of changing an integrated circuit (IC) card-holder's information in an IC card system including a center apparatus and an IC card having stored therein card-holder's information comprising a plurality of information items for identification, said method comprising:

providing a storage area in said IC card for storing change-allowance-information indicative of whether a change request can be processed;

receiving a new change request for changing a present content of one or more of said plurality of information items for identification;

checking said change-allowance-information to determine whether the new change request can be processed;

rejecting said new change request if said change-allowance-information indicates change in progress;

if said change-allowance-information indicates no change is in progress:

changing said change-allowance-information to indicate change in progress;

receiving and storing in said IC card new content for said one or more of the plurality of information items for identification in accordance with said new change request;

transmitting said new content to said center apparatus;
updating in said center apparatus one or more of a plurality of information items corresponding to said one or more of the plurality of information items for identification in said IC card with said new content; and
changing said change-allowance-information to indicate no change is in progress.

2. The method of claim 1 wherein said act of receiving and storing in said IC card comprises:
maintaining said present content of said one or more of the plurality of information items for identification.

3. The method of claim 2 wherein said act of updating further comprises:
comparing said present content of said one or more of the plurality of information items for identification in the IC card to a content of the corresponding one or more of the plurality of information items in said center apparatus;
if no match is found, maintaining said content of said corresponding one or more of the plurality of information items for identification in said center apparatus; and
if a match is found, updating said content of said corresponding one or more of the plurality of information items in the center apparatus with the new content.

4. The method of claim 1 further comprising:
prior to said act of changing said change-allowance-information to indicate change is in progress, receiving identification information from a requester of the change request to determine if said change request is made by an authorized party;
comparing said identification information with a corresponding predesignated identification information stored in said IC card as an un-changeable information;
if no match is found, rejecting the change request; and
if a match is found, continuing the process of changing said card-holder's information.

5. The method of claim 1 wherein said change is in progress corresponds to a condition wherein a previous change request is in the course of being processed by the IC card system, and said no change is in progress corresponds to a condition wherein either the processing of a previous change request has been completed by the IC card system or no previous change request has been made.

6. The method of claim 1 wherein said plurality of information items for identification includes a postal code, phone number, address, and password.

7. An integrated circuit (IC) card system comprising:
an IC card having stored therein IC card-holder's information comprising a plurality of information items;
a center apparatus configured to transmit or receive information to or from said IC card,
wherein said IC card comprises:
an interface unit having a receiver configured to receive change requests for changing said card-holder's information, and a transmitter configured to transmit changed card-holder's information to said center apparatus;
a storage unit configured to store change-allowance-information for indicating change in progress if said card-holder's information is in the process of being changed in response to a previous change request, or no change is in progress if said card-holder's information is not in the process of being changed;
a change-judging unit configured to check said change-allowance-information, said change-judging unit rejecting a new change request if said change-allowance-information indicates change is in progress, and allowing a now change request to be processed if said change-allowance-information indicates no change is in progress;
a change-allowance-information register configured to set said change-allowance-information to indicate change is in progress in response to a new change request if said card-holder's information is not in the process of being changed in response to a previous change request; and
an information-changing unit configured to receive a new content for replacing a present content of one or more of said plurality of information items in accordance with a new change request, and to store said new content in said IC card if said change-judging unit allows the new change request to be processes, and
wherein said center apparatus comprises:
an interface unit having a receiver configured to receive said new content; and
an information-changing unit configured to replace in said center apparatus a present content of one or more of a plurality of information items corresponding to said one or more of the plurality of information items in said IC card with said new content, and to reset said change-allowance-information in said IC card to indicate no change is in progress.

8. An integrated circuit (IC) card configured to communicate information to or from a center apparatus, said IC card comprising:
an interface unit having a receiver configured to receive change requests for changing IC card-holder's information stored in said IC card, said IC card holder's information comprising a plurality of information items for identification;
a recording area configured to store change-allowance-information for indicating change is in progress if said card-holder's information is in the process of being changed in response to a previous change request, or no change is in progress if said card-holder's information is not in the process of being changed;
a change-judging unit configured to check said change-allowance-information, said change-judging unit rejecting a new change request if said change-allowance-information indicates change is in progress, and allowing a new change request to be processed if said change-allowance-information ion indicates no change is in progress;
a change-allowance-information register configured to set said change-allowance-information to indicate change is in progress in response to a new change request if said card-holder's information is not in the process of being changed in response to a previous change request; and
an information-changing unit configured to receive a new content for replacing a present content of one or more of said plurality of information items for identification in accordance with the new change request, and to store said new content in said IC card if said change-judging unit allows the new change request to be processes.

9. The IC card system of claim 8 wherein said plurality of information items for identification includes a postal code, phone number, address, and password.

* * * * *